(12) United States Patent
Holzwarth et al.

(10) Patent No.: US 9,685,278 B2
(45) Date of Patent: Jun. 20, 2017

(54) ENERGY STORAGE DEVICES HAVING ENHANCED SPECIFIC ENERGY AND ASSOCIATED METHODS

(71) Applicant: Intel Corporation, Santa Clara, CA (US)

(72) Inventors: Charles W. Holzwarth, San Jose, CA (US); Cary L. Pint, Nashville, TN (US); Michael C. Graf, Palo Alto, CA (US); Bum Ki Moon, Gilroy, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/150,226

(22) Filed: May 9, 2016

(65) Prior Publication Data
US 2016/0254105 A1    Sep. 1, 2016

Related U.S. Application Data (62) Division of application No. 13/929,724, filed on Jun. 27, 2013, now Pat. No. 9,355,790.

(51) Int. Cl.
| | |
|---|---|
| *H01G 11/86* | (2013.01) |
| *H01G 11/24* | (2013.01) |
| *H01G 11/26* | (2013.01) |
| *H01G 11/28* | (2013.01) |
| *H01G 11/30* | (2013.01) |
| *H01G 11/32* | (2013.01) |
| *H01G 11/12* | (2013.01) |
| *B82Y 30/00* | (2011.01) |

(52) U.S. Cl.
CPC ............. *H01G 11/86* (2013.01); *H01G 11/24* (2013.01); *H01G 11/26* (2013.01); *H01G 11/28* (2013.01); *H01G 11/30* (2013.01); *H01G 11/32* (2013.01); *B82Y 30/00* (2013.01); *H01G 11/12* (2013.01); *Y02E 60/13* (2013.01); *Y10S 977/948* (2013.01)

(58) Field of Classification Search
CPC ........ H01G 11/86; H01G 11/24; H01G 11/26; H01G 11/28; H01G 11/30; H01G 11/32
See application file for complete search history.

(56) References Cited

U.S. PATENT DOCUMENTS

| | | | | |
|---|---|---|---|---|
| 6,334,856 B1 * | 1/2002 | Allen | ................. | A61B 5/14514 128/898 |
| 6,617,191 B1 * | 9/2003 | Iwata | ................. | G01P 15/0802 257/E21.216 |

(Continued)

*Primary Examiner* — Duy Deo
(74) *Attorney, Agent, or Firm* — Thorpe North and Western, LLP; David W. Osborne

(57) ABSTRACT

Ultracapacitor electrodes having an enhanced electrolyte-accessible surface area are provided. Such electrodes can include a porous substrate having a solution side and a collector side, the collector side operable to couple to a current collector and the solution side positioned to interact with an electrolytic solution when in use. The electrode can also include a conductive coating formed on the solution side of the porous substrate. The coating can have a first side positioned to interact with an electrolytic solution when in use and a second side opposite the first side. The coating can have discontinuous regions that allow access of an electrolyte solution to the second side during use to enhance electrolyte-accessible surface area of the conductive coating.

19 Claims, 4 Drawing Sheets

(56) References Cited

U.S. PATENT DOCUMENTS

2002/0096489 A1\* 7/2002 Lee .................... B41J 2/14137
  216/27
2004/0065932 A1\* 4/2004 Reichenbach ...... B81C 1/00293
  257/415

\* cited by examiner

ENERGY STORAGE DEVICES HAVING ENHANCED SPECIFIC ENERGY AND ASSOCIATED METHODS

PRIORITY DATA

This application is a divisional of U.S. patent application Ser. No. 13/929,724, filed Jun. 27, 2013, which is incorporated herein by reference in its entirety.

TECHNICAL FIELD

Embodiments described herein relate generally to energy storage devices.

BACKGROUND

Energy storage devices, including batteries and capacitors, are often used in various electronic devices. Capacitors, for example, are widely used for applications ranging from electrical circuitry and power delivery to voltage regulation and battery replacement. As capacitor technology has continued to develop, several types have emerged. As one example, electric double-layer capacitors (EDLCs), also referred to as ultracapacitors, are characterized by high energy storage and power density, small size, and low weight and have thus become promising candidates for use in several applications.

Ultracapacitors and similar high-surface-area charge storage devices can be used for a variety of purposes, including in microelectronics to store energy, for electrical bypassing in electric circuits, as part of circuitry for power delivery, as a memory storage element, and for a host of other functions. One advantage of ultracapacitors over batteries is that ultracapacitors can be charged and discharged quickly because they do not rely on chemical reactions to store energy, and they don't degrade significantly over their lifetime; even when charged and discharged rapidly. Ultracapacitors are also less sensitive to temperature than are batteries.

Although current ultracapacitors have very high specific power, they have a relatively low specific energy (Wh/kg) compared to battery systems and thus have limited applications for energy storage devices.

DESCRIPTION OF EMBODIMENTS

Although the following detailed description contains many specifics for the purpose of illustration, a person of ordinary skill in the art will appreciate that many variations and alterations to the following details can be made and are considered to be included herein.

Accordingly, the following embodiments are set forth without any loss of generality to, and without imposing limitations upon, any claims set forth. It is also to be understood that the terminology used herein is for the purpose of describing particular embodiments only, and is not intended to be limiting. Unless defined otherwise, all technical and scientific terms used herein have the same meaning as commonly understood by one of ordinary skill in the art to which this disclosure belongs.

As used in this specification and the appended claims, the singular forms "a," "an" and "the" include plural referents unless the context clearly dictates otherwise. Thus, for example, reference to "a layer" includes a plurality of such layers.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open ended term, like "comprising" or "including," it is understood that direct support should be afforded also to "consisting essentially of" language as well as "consisting of" language as if stated explicitly.

"The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein. The term "coupled," as used herein, is defined as directly or indirectly connected in an electrical or nonelectrical manner. Objects described herein as being "adjacent to" each other may be in physical contact with each other, in close proximity to each other, or in the same general region or area as each other, as appropriate for the context in which the phrase is used. Occurrences of the phrase "in one embodiment," or "in one aspect," herein do not necessarily all refer to the same embodiment or aspect.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually.

This same principle applies to ranges reciting only one numerical value as a minimum or a maximum. Furthermore, such an interpretation should apply regardless of the breadth of the range or the characteristics being described.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment.

Example Embodiments

An initial overview of technology embodiments is provided below and specific technology embodiments are then described in further detail. This initial summary is intended to aid readers in understanding the technology more quickly but is not intended to identify key or essential features of the technology, nor is it intended to limit the scope of the claimed subject matter.

As has been described, current ultracapacitors have very high specific power but relatively low specific energy (Wh/kg) compared to battery systems and thus have limited applications for energy storage devices. Current commercially available ultracapacitors are typically carbon based, although silicon based ultracapacitors have recently been contemplated. Silicon based ultracapacitors typically employ a porous silicon substrate material coated with a second material that is conductive and inert. Since carbon is naturally conductive and highly inert, no passivation is required for carbon based electrodes and no additional layers are used. The coating of second material in an activated electrode of a silicon based ultracapacitor typically has only one surface that is active and the electrolyte forms a double layer on that surface. The other surface is inactive since it is in contact with the porous silicon.

Aspects of the present disclosure provide methods and techniques for increasing the specific energy of an ultracapacitor, such as, for example, increasing the capacitance, decreasing the device weight, and the like. In one embodiment, specific energy can be increased by increasing the available surface area of the ultracapacitor electrodes. In another embodiment, the weight of the device can be decreased by removing at least a portion of the electrode material to provide regions that can be filled with electrolyte. Since the electrolyte has a lower mass density than the electrode, a packaged device utilizing one or more of these approaches can have a higher specific capacitance and/or energy as compared to ultracapacitor electrodes that have not been so treated.

Figure 1:
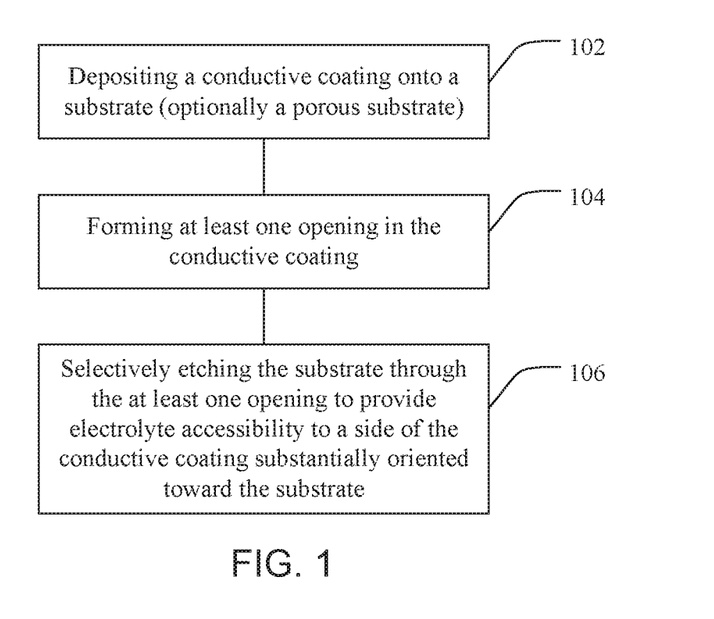
FIG. 1 is a flow diagram of a method of making an ultracapacitor electrode having an enhanced electrolyte-accessible electrically conductive surface area in accordance with one invention embodiment.

In one embodiment, as is shown in FIG. 1 for example, a method of making an ultracapacitor electrode having an enhanced electrolyte-accessible electrically conductive surface area can include 102 depositing a conductive coating onto a porous substrate, 104 forming at least one opening in the conductive coating, and 106 selectively etching the porous substrate through the at least one opening to provide electrolyte accessibility to a side of the conductive coating substantially oriented toward the porous substrate. Thus by etching the porous substrate through openings in the conductive coating, regions of the conductive coating that were previously contacting, or substantially contacting, the porous substrate can be made accessible to electrolyte thereby increasing the available surface area of the conductive coating. Additionally, the portions of the porous substrate that have been etched away create open regions that can accommodate a greater amount of electrolyte. These effects taken separately or together can increase the specific energy of the ultracapacitor.

The selective etch can thus remove at least a portion of the porous substrate to allow the backside or previously inaccessible surface of the conductive material to be active and allow the use of this inner surface as additional surface area for the double layer to form. Thus, the conductive coating combined with the porous substrate allows a selective etching to form increased surface area to an extent that would not be possible using a single material. Many traditional processes using a porous electrode material are limited to a surface area that was essentially fixed at the creation of the porous material itself. Surface area cannot generally be significantly enhanced beyond such initial processing.

It is noted that in some embodiments only a portion of the porous substrate is selectively etched away leaving a combination of porous substrate and conductive material having a high surface area. In other embodiments substantially all or all of the porous substrate is selectively etched away leaving at least primarily a conductive material having a high surface area. It is also noted that the choice of materials used in constructing the porous substrate and the conductive coating can be dependent upon the selective etching process utilized, or alternatively, that the selective etching process can be dependent upon the materials used for the conductive coating and the porous substrate. Thus in one embodiment, the etching process can selectively etch the porous substrate while leaving the conductive coating at least substantially undisturbed.

Figure 2:
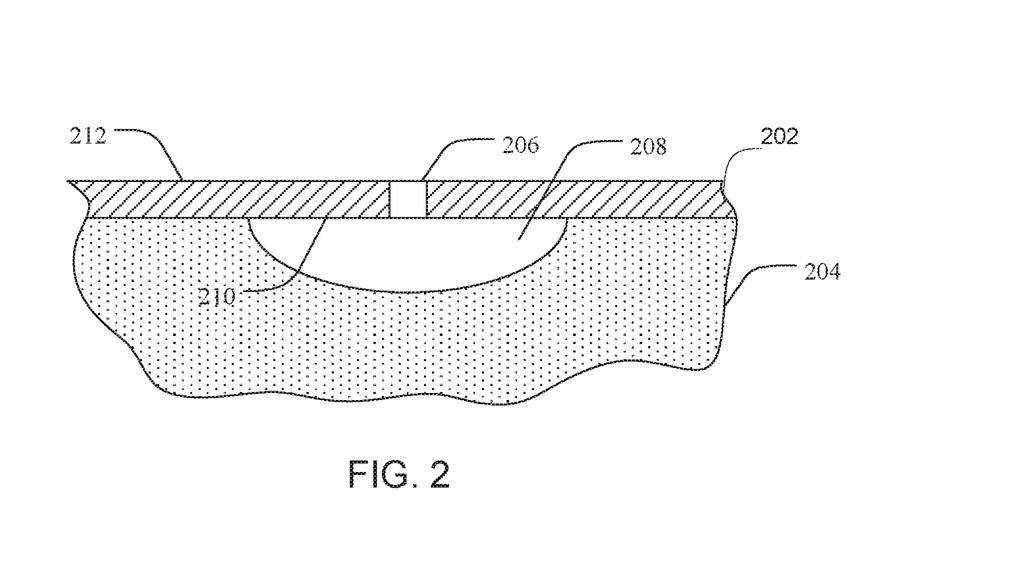
FIG. 2 is a schematic view of a section of an ultracapacitor electrode in accordance with another invention embodiment.

As is shown in FIG. 2, a conductive coating 202 having a first surface 212 is formed on a substrate 204. The first surface 212 is generally oriented so as to face in the same direction as a surface of the substrate 204 underlying the conductive coating 202, and upon which it was deposited. Typically, the first surface 212 is not, and has not been, in contact with any other material prior to introduction of an electrolyte into the device. The substrate can be a porous substrate upon which the conductive coating is formed, or the substrate can be a non-porous substrate that is made porous following the deposition of the conductive coating. At least one opening 206 can be formed in the conductive coating 202. In one embodiment, the conductive coating can be deposited as a continuous, or at least substantially continuous, coating and the at least one opening is subsequently formed therein. In another embodiment, the conductive coating can be formed as a discontinuous coating and openings are thus discontinuities in the coating as it was formed. Thus openings can be actively formed in the coating, or openings can be present in the coating as it forms (i.e. passively formed), or both.

The substrate 204 can be selectively etched through the at least one opening 206, thus forming one or more voids 208 in the substrate 204. Such voids provide electrolyte accessibility to a side 210 of the conductive coating 202 that was previously in contact with the porous substrate 204, or that is substantially oriented toward the porous substrate 204 (and therefore facing in an opposite direction, or substantially opposite direction than the first surface 212). This side 210 of the conductive coating 202 can also be referred to as the second side. By removal of the substrate material 202 and exposure of the second side 210 of the conductive coating 202, the weight of the porous substrate 204 is decreased, the electrolyte-accessible surface area of the conductive coating 202 is increased, and the electrolyte capacity of the electrode is increased.

Figure 3:
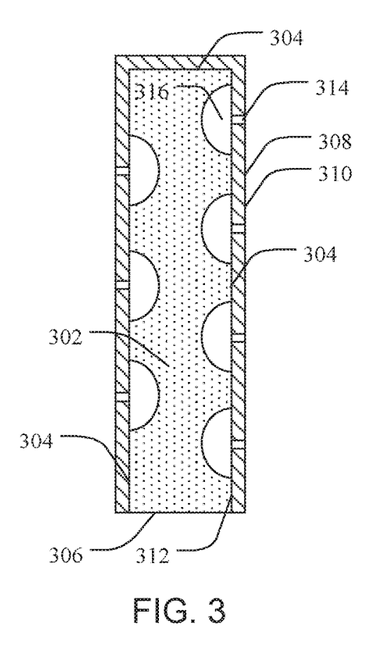
FIG. 3 is a schematic view of an ultracapacitor electrode in accordance with another invention embodiment.

In another embodiment, an ultracapacitor electrode having an enhanced electrolyte-accessible surface area is shown in FIG. 3. The electrode can include a porous substrate 302 having a solution side 304 and a collector side 306. The solution side includes a side of the porous substrate that is oriented toward or positioned to interact with an electrolytic solution when in use. It is contemplated that such orientation/interaction can include situations where the porous substrate directly contacts the electrolytic solution, as well as situations where the porous substrate does not directly contact the electrolytic solution, as may be the case for an intermediate layer of material disposed therebetween. The collector side 306 includes a side of the porous substrate 302 that is operable to couple to a current collector, either directly or indirectly. Thus for the specific embodiment shown in FIG. 3, the collector side 306 couples to a current collector (not shown) while the three shown solution sides are oriented toward the electrolytic solution.

A conductive coating 308 is formed on the solution side 304 of the porous substrate 302. The conductive coating 308 has a first side 310 and a second side 312. The first side 310 is positioned to interact with an electrolytic solution when in use and the second side 312 is opposite the first side 310. Note that in the absence of selective etching, the second side 312 is in contact with the substrate 302 and is, for the most part, inaccessible to the electrolytic solution. The conductive coating 308 has discontinuous regions or openings 314 that allow access of the electrolytic solution to the second side 312 during use to enhance electrolyte-accessible surface area of the conductive coating 308. Voids 316 generated by selective etching in the substrate 302 can enhance electrolytic access to the second side 312. It is noted that the configuration shown here is merely exemplary and that any electrode design where the second side of the conductive coating is electrolyte accessible is considered to be within the present scope.

Figure 4A:
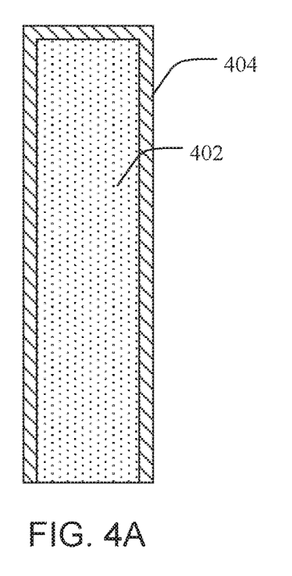
FIG. 4A is a schematic view of an ultracapacitor electrode being made in accordance with yet another invention embodiment.
Figure 4B:
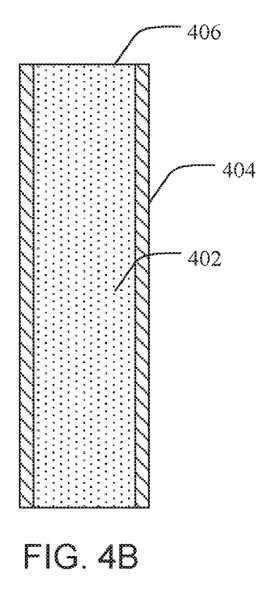
FIG. 4B is a schematic view of an ultracapacitor electrode being made in accordance with yet another invention embodiment.
Figure 4C:
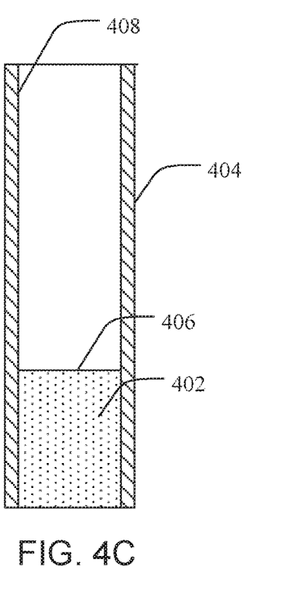
FIG. 4C is a schematic view of an ultracapacitor electrode being made in accordance with yet another invention embodiment.

One non-limiting example of an alternative design for an electrode is shown in FIGS. 4A-C. FIG. 4A shows a substrate 402 having a conductive coating 404 formed thereon. A portion of the conductive coating 404 has been removed to uncover an exposed portion 406 of the substrate 402, as is shown in FIG. 4B. The substrate 402 is then selectively etched starting at the exposed portion 406. Such selective etching removes at least a portion of the substrate 402 to create an electrolyte-accessible surface 408 of the conductive coating 404 where the substrate 402 has been etched away (See FIG. 4C). These portions of the conductive coating 404 can be free-standing or self-supporting as the underlying substrate 402 has been removed. It is understood that any amount of the substrate can be removed, depending upon the desired design of the electrode. Additionally, substantial portions of the substrate can be removed through a plurality of openings in the conductive coating to form a free-standing or self-supporting structure.

In some embodiments, following the removal of substrate material using the secondary activation step, a subsequent operation to deposit additional conductive coating on the newly exposed surface area of the substrate material can be made. In such event, the depositing of the conductive coating can be made (i.e. repeated) through the openings in the conductive coating and onto newly exposed portions of the porous substrate to further increase specific energy. For example, a secondary conductive coating can be formed on etched portions of the porous substrate through the openings in the conductive coating. Secondary openings can then be formed in the secondary conductive coating through which a selective etch can be used to further etch the porous substrate. In this way, accessibility to the side of the secondary conductive coating oriented toward the etched porous substrate can be provided to increase surface area, and regions opened up through the etching of the porous substrate can provide additional electrolyte space. In some embodiments these processes can be repeated until all, or substantially all, of the porous substrate has been replaced by a subsequent conductive coating.

Figure 5:
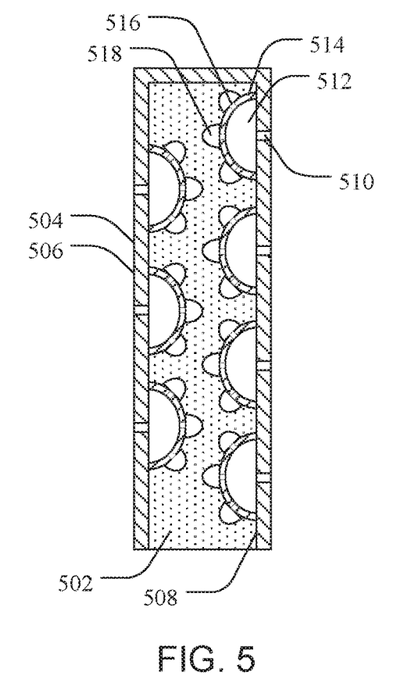
FIG. 5 is a schematic view of an ultracapacitor electrode in accordance with another invention embodiment.

As is shown in FIG. 5, for example, an electrode can have a substrate 502 having a conductive coating 504 formed thereon. The conductive coating 504 has a first side 506 and a second side 508. The first side 506 is positioned to interact with an electrolytic solution when in use and the second side 508 is opposite the first side 506. The conductive coating 504 has discontinuous regions or openings 510 that allow access of the electrolytic solution to the second side 508 during use to enhance electrolyte-accessible surface area of the conductive coating 504. Voids 512 created by selective etching in the substrate 502 can enhance electrolytic access to the second side 508. To further enhance the electrolyte-accessible surface area, a secondary conductive coating 514 can be deposited on surfaces of the voids 512 (i.e. etched surfaces of the substrate 502) through the openings 510. Secondary openings 516 (or in some cases, at least one secondary opening) are created in the secondary conductive coating 514, either via an etching process or by depositing the secondary conductive coating as a discontinuous layer. Further portions of the substrate 502 can then be selectively etched through the secondary openings 516 to generate secondary voids 518, thus providing electrolyte accessibility to a side of the secondary conductive coating 514 substantially oriented toward the etched substrate that was previously inaccessible. These processes can be further repeated to generate progressively more electrolyte-accessible surface area with each iteration.

It is also noted that, for materials that do not interact with the electrolyte solution in a beneficial way (e.g. non-doped porous silicon), the inside surfaces of voids (e.g. 512 in FIG. 5) where the substrate material will be exposed to electrolyte may not provide useful surface area. In some embodiments, therefore, conductive coating can be deposited onto the inside surfaces of such voids (with or without further selective etch processing) to increase the usable surface area capable of interacting with the electrolyte.

A variety of substrate materials are contemplated, and any material capable of supporting a conductive coating and allowing selective etching to occur in a manner suitable for the creation of an electrode is considered to be within the present scope. In one embodiment, the substrate can be formed as a porous substrate. Non-limiting examples of such porous substrates can include carbon nanotubes, carbon nanofibers, graphene structures, particulate materials, and the like. In the case of particulate materials, it can be beneficial to hold the particles together with a conductive binder. In another embodiment, the substrate can be a nonporous material that is transformed into a porous material. Non-limiting examples of such materials can include nano- or micro-structured materials, porous etched materials, laser ablated materials, anodized materials, and the like. Suitable starting materials can include metals, semiconductors, silicon, carbon, silicon carbide, activated carbon, aluminum, and the like, including combinations thereof. In one specific embodiment, the substrate can be porous silicon. In another specific embodiment, the porous silicon is doped. Following the creation of the porous substrate, the conductive coating can be deposited thereon.

It is also contemplated that in some embodiments the conductive coating can be applied to a nonporous substrate followed by selective etching to form an underlying porous substrate. In other embodiments, the nonporous substrate can be substantially etched away to form a self-supporting or free-standing conductive coating electrode, although it is noted that self-supporting structures can similarly be formed via the etching of an underlying porous substrate.

A variety of materials suitable for use as conductive coatings are contemplated, and any material capable of use as an electrode is considered to be within the present scope.

Non-limiting examples of conductive coating materials can include metals, metal nitrides, metal silicides, metal carbides, metal borides, carbon and the like, including combinations thereof. Other more specific non-limiting examples can include titanium nitride, tungsten nitride, tantalum nitride, and the like, including combinations thereof. Additionally, the conductive coating can be applied to any thickness, depending on the desired design and functionality of the resulting electrode. In one embodiment, however, the conductive coating can have an average thickness of from about 5 nm to about 50 nm thick. In some embodiments the film may have a thickness that is sufficiently thick to allow the conduction of electrons (i.e. the conductivity of a thin film is directly proportional to thickness) and be thin enough so that it does not substantially fill the porous substrate. In another embodiment the thickness may be less than 5 nm thick providing a discontinuous film with naturally occurring openings for a selective etch. In this embodiment the electrons are conducted by the thin film and at least partially by the porous substrate.

While in many cases the conductive coating is deposited onto the substrate, in some embodiments the conductive coating can be formed on the substrate through the interaction of the substrate with an overlying reactive material. For example, a reactive material can be deposited onto the substrate such that reaction between the substrate and the reactive material forms the conductive coating (i.e. a conductive alloy). In some embodiments reaction can be facilitated by heating the reactive material and the substrate to form the conductive coating at an interface between the reactive material and the porous substrate. In this case the heating can cause intermixing of the two materials to form a beneficial alloy. As one example, porous silicon can be coated with nickel and heated to form a NiSix material at the Ni—Si interface. Following generation of the conductive coating, the reactive material can be at least partially removed to expose the conductive coating. In the Si/Ni reaction, unreacted nickel can be removed using an appropriate selective etch, such as $H_2SO_4/H_2O_2/H_2O$ with, for example, a 4:1:60 ratio. In another example, the reactive material may be carried in a gas or vapor phase, such as acetylene ($C_2H_2$). At high temperature the acetylene can react with the porous substrate to form SiC on the surface. The remaining acetylene can be removed via pumping the substrate down to a low pressure.

It can be beneficial to select both the substrate and conductive coating materials with a selective etch process in mind. To generate the increased surface area on the backside of the conductive coating (i.e. the side contacting or facing the substrate), it is useful to utilize an etch process that etches the substrate while leaving the conductive coating at least substantially unaffected. If an etch is used that etches both the substrate and the conductive coating to a substantial extent, the conductive coating can be etched away or chemically polished, thus reducing if not eliminating the surface area gains described herein. As such, in general any etch can be used provided there is sufficient etch selectivity between the substrate and the conductive coating. In one embodiment, for example, the selective etch can be a dry etch. In another embodiment, the selective etch can be a wet etch.

In one specific example, the substrate material can be porous silicon, the conductive coating can be titanium nitride (TiN), and the etch process can be a selective etch for these materials such as $XeF_2$ for dry etching, KOH for wet etching, and the like. $XeF_2$, for example, has a high selectivity between TiN and porous silicon at low temperature, and can thus selectively etch the porous silicon without substantially affecting the TiN. In this way, surfaces of the TiN coating facing the porous silicon substrate are now electrolyte-accessible, thus increasing the surface area of the electrode. It is noted that openings in the TiN coating can be present due to discontinuous deposition, by an etch process that is selective for TiN, or by other techniques, such as mechanical perturbation or thermal cycling.

In another embodiment, a conductive coating can be formed on a substrate by a technique such as atomic layer deposition (ALD). In ALD, the "seeding" layer determines the conformity of the thin film growth process. In a typical Volmer-Weber thin-film growth mechanism discontinuous islands form up until a critical thickness is reached. As such, a conductive coating can be deposited as a discontinuous layer having openings that expose the underlying substrate material. As such, the substrate material can be selectively etched without the need for creating openings in the conductive coating as those openings are present upon deposition.

In another embodiment, a substrate material such as porous silicon can be selectively etched by a process such as stain etching, which will slowly etch holes into the silicon structure where not protected by the conductive coating. Stain etching can be accomplished in a variety of ways, one example of which is a combination of hydrofluoric acid, nitric acid, and water.

As another example, carbon materials such as, for example, graphene, activated carbon, carbon nanotubes, (both multi-walled and single-walled), carbon nanofibers, other carbon structure with nano or micro-scale features, and the like, can be assembled into a high surface area substrate structure, and then coated with a passivation coating using a process such as ALD. Since carbon is generally not reactive with ALD precursors, the passivation material coating on carbon surfaces often form non-continuous films. In order to etch pits into the carbon material, a reactive species (such as oxygen plasma, ozone, etc.) can be utilized. In the areas where the passivation coating is deposited, the reactive species will not etch the carbon. However, in the regions where the carbon is exposed, pores and pits will be etched into the carbon at an extent/rate that is governed by the exposure time to the reactive species. After this step, in some cases the device can be utilized as is (in the case where the passivation coating is a conductive coating), or in other cases the thin film ALD coating can be dissolved or etched away to leave a pristine carbon material with a greater surface area and lower weight than when it was formed, which favors better performance for an electrochemical energy storage device.

Figure 6:
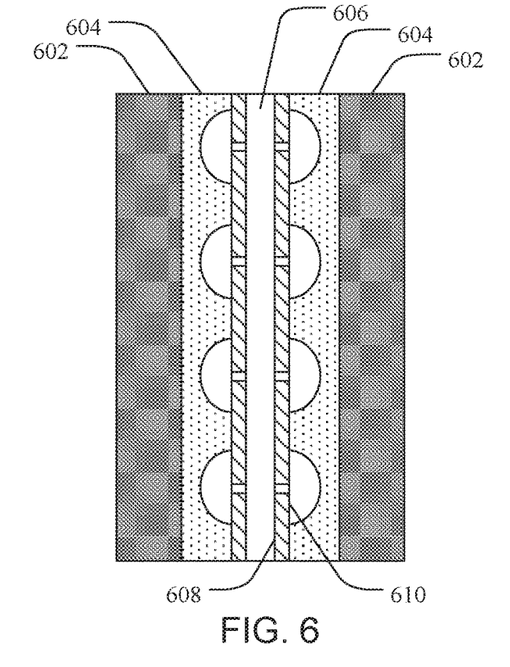
FIG. 6 is a schematic view of an ultracapacitor device in accordance with another invention embodiment.

Furthermore, the present selectively etched electrode materials can be utilized in a variety of devices, including ultracapacitor electrodes, ultracapacitors, hybrid capacitors, pseudocapacitors, and the like. In one embodiment, for example, an ultracapacitor having increased specific energy is provided, as is shown in FIG. 6. The ultracapacitor includes at least two current collectors 602 each coupled to an electrode 604 as has been described. The current collectors 602 are positioned such that the electrodes 604 face one another. An electrolyte solution 606 is disposed between the electrodes 604 such that the electrolyte contacts at least a portion of the first side 608 and at least a portion of the second side 610 of the conductive coatings of each electrode 604. In one specific embodiment, the electrolyte contacts at least about 5% of the second side 610 of the conductive coatings of each electrode 604. In some embodiments, a separator material can be disposed between the two electrodes 604. It is also contemplated that, in some embodiments, a plurality of ultracapacitor cells can be stacked together to create a charged storage system.

Figure 7:
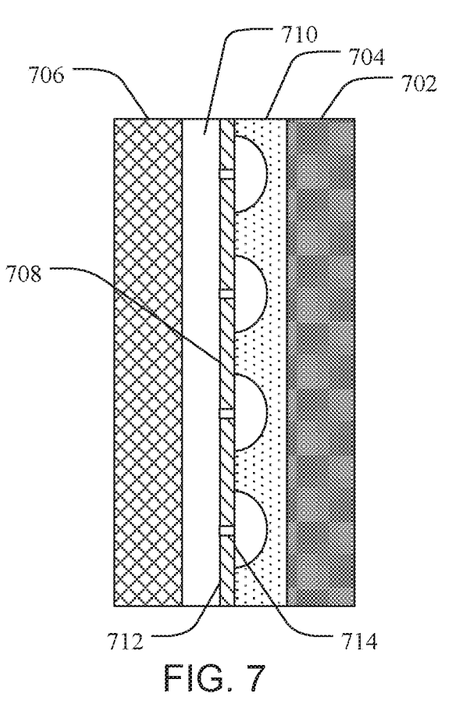
FIG. 7 is a schematic view of a capacitor in accordance with another invention embodiment.

In another embodiment, a capacitor having increased specific energy is provided, as is shown in FIG. 7. Such a capacitor can include a current collector 702 coupled to an ultracapacitor electrode 704 as has been described. A faradaic electrode 706 is positioned to face the conductive coating 708 of the ultracapacitor electrode 704. An electrolyte solution 710 is disposed between the faradaic electrode 706 and the ultracapacitor electrode 704 such that the electrolyte solution 710 contacts at least a portion of the first side 712 and at least a portion of the second side 714 of the conductive coating 708 of the ultracapacitor electrode 704 and a surface of the faradaic electrode 706. In some embodiments it can be beneficial for the capacities and/or capacitances of the faradaic electrode and the ultracapacitor electrode to at least substantially balance.

The faradaic electrode can include any useful matter that is faradaically active. In one embodiment, for example, the faradaic electrode can be a pseudocapacitive material such as transition metal oxides, transition metal nitrides, and conducting polymers. Further non-limiting examples include nickel oxide, manganese oxide, ruthenium oxide, titanium oxide, niobium oxide, vanadium nitride, polyaniline and the like. In other embodiments, the faradaically active material may be a battery anode or cathode materials, such as, graphite, lithiated transition metal oxides (LiCoO$_x$, LiNi$_x$Mn$_y$Co$_z$O, lithium titanate, etc.), silicon, tin, phosphates, flurophosphates, silicates, borates, and the like.

A variety of specific methods may be employed in the creation of electrodes and energy storage devices, such as capacitors or ultracapacitors utilizing such electrodes as described herein. In one example, a method of making an ultracapacitor electrode having an enhanced electrolyte-accessible electrically conductive surface area may include depositing a conductive coating onto a substrate, forming at least one opening in the conductive coating, and selectively etching the substrate through the at least one opening to provide electrolyte accessibility to a side of the conductive coating substantially oriented toward the porous substrate.

In one example, the substrate can be a porous material at the time that the conductive coating is deposited thereon.

In one example, the method can further include depositing a secondary conductive coating on the etched substrate, forming at least one secondary opening in the secondary conductive coating, and selectively etching the etched substrate through the at least one secondary opening to provide electrolyte accessibility to a side of the secondary conductive coating substantially oriented toward the etched substrate.

In one example, the method can include repeatedly depositing a subsequent conductive coating on the etched substrate, forming at least one subsequent opening in the subsequent conductive coating, and selectively etching the etched substrate through the at least one subsequent opening until substantially all of the substrate is replaced with the subsequent conductive coating.

In one example, selectively etching the substrate through the at least one opening further includes removing a sufficient portion of the substrate such that at least a portion of the conductive coating is free-standing.

In one example, the substrate includes a member selected from the group consisting of: a semiconductor, a metal, carbon, graphene, activated carbon, carbon nanotubes, carbon nanofibers, or combinations thereof.

In one example, the substrate is silicon.

In one example, the method can include doping the silicon.

In one example, depositing the conductive coating further includes depositing a material selected from the group consisting of: metals, metal nitrides, metal silicides, metal carbides, metal borides, or combinations thereof.

In one example, depositing the conductive coating further includes depositing a material selected from the group consisting of: titanium nitride, tungsten nitride, tantalum nitride, or combinations thereof.

In one example, the selective etch is a dry etch.

In one example, the selective etch is a wet etch.

In one example, the substrate is silicon, the conductive coating is titanium nitride, and the etch is $XeF_2$ or KOH.

In one example, forming the at least one opening in the conductive coating further includes depositing the conductive coating onto the porous substrate as a discontinuous coating.

In one example, depositing the conductive coating on the substrate includes coating a reactive material onto the substrate and reacting the reactive material with the substrate to form a conductive alloy.

In one example, reacting the reactive material with the substrate further includes heating the reactive material and the substrate to form the conductive coating at an interface between the reactive material and the substrate, and removing the reactive material to expose the conductive coating.

In an example embodiment, an ultracapacitor electrode having an enhanced electrolyte-accessible surface area, can include, a porous substrate having a solution side and a collector side, the collector side operable to couple to a current collector and the solution side positioned to interact with an electrolytic solution when in use. The electrode can further include a conductive coating formed on the solution side of the porous substrate and having a first side positioned to interact with an electrolytic solution when in use and a second side opposite the first side. The conductive coating can have discontinuous regions that allow access of an electrolyte solution to the second side during use to enhance electrolyte-accessible surface area of the conductive coating.

In one example, at least a portion of the porous substrate is removed to further enhance the electrolyte-accessible surface area of the conductive coating.

In one example, embodiment at least a portion of the conductive coating is free-standing.

In one example, the electrode may include a secondary conductive coating formed on an exposed portion of the porous substrate and having a secondary first side positioned to interact with an electrolytic solution when in use and a secondary second side opposite the secondary first side. The secondary conductive coating can have secondary discontinuous regions that allow access of an electrolyte solution to the secondary second side during use to enhance electrolyte-accessible surface area of the secondary conductive coating.

In one example, the porous substrate includes a member selected from the group consisting of: a semiconductor, a metal, carbon, graphene, activated carbon, carbon nanotubes, carbon nanofibers, anodized aluminum, or combinations thereof.

In one example, the porous substrate is porous silicon.

In one example, the porous silicon is doped.

In one example, the porous substrate is a particulate.

In one example, the particulate is held together by the conductive coating.

In one example, the conductive coating includes a material selected from the group consisting of: metals, metal nitrides, metal silicides, metal carbides, metal borides, carbon or combinations thereof.

In one example, the conductive coating includes a material selected from the group consisting of: titanium nitride, tungsten nitride, tantalum nitride, or combinations thereof.

In an example embodiment, an ultracapacitor may include at least two current collectors each coupled to an electrode as recited herein, wherein the current collectors are positioned such that the electrodes face one another, and an electrolyte disposed between the electrodes such that the electrolyte contacts at least a portion of the first side and at least a portion of the second side of the conductive coatings of each electrode.

In one example, the electrolyte contacts at least about 5% of the second side of the conductive coatings of each electrode.

In one example embodiment a charge, or energy, storage system can include a stack of ultracapacitor cells, including at least one ultracapacitor as recited herein.

In one example embodiment a capacitor can include a current collector coupled to an ultracapacitor electrode as recited herein, a faradaic electrode positioned to face the conductive coating of the ultracapacitor electrode, and an electrolyte disposed between the faradaic electrode and the ultracapacitor electrode such that the electrolyte contacts at least a portion of the first side and at least a portion of the second side of the conductive coating of the ultracapacitor electrode and a surface of the faradaic electrode.

In one example, the faradaic electrode includes at least one of the following: psuedocapacitve, battery anode, or battery cathode material.

In one example, the faradaic electrode includes a material selected from the group consisting of: transition metal oxides, transition metal nitrides, conducting polymers, nickel oxide, manganese oxide, ruthenium oxide, titanium oxide, niobium oxide, vanadium nitride, polyanilline, graphite, lithiated transition metal oxides ($LiCoO_x$, $LiNi_xMn_yCo_zO$, lithium titanate, etc.), silicon, tin, phosphates, flurophosphates, silicates, borates, or combinations thereof.

While the forgoing examples are illustrative of the specific embodiments in one or more particular applications, it will be apparent to those of ordinary skill in the art that numerous modifications in form, usage and details of implementation can be made without departing from the principles and concepts articulated herein. Accordingly, no limitation is intended except as by the claims set forth below.

What is claimed is:

1. A method of making an ultracapacitor electrode having an enhanced electrolyte-accessible electrically conductive surface area, comprising:
    depositing a conductive coating onto a substrate;
    forming at least one opening in the conductive coating; and
    selectively etching the substrate through the at least one opening to provide electrolyte accessibility to a side of the conductive coating substantially oriented toward the substrate wherein the substrate is a porous material at the time that the conductive coating is deposited thereon.

2. The method of claim 1, further comprising:
    depositing a secondary conductive coating on the etched substrate;
    forming at least one secondary opening in the secondary conductive coating; and selectively etching the etched substrate through the at least one secondary opening to provide electrolyte accessibility to a side of the secondary conductive coating substantially oriented toward the etched substrate.

3. The method of claim 2, further comprising repeatedly:
depositing a subsequent conductive coating on the etched substrate;
forming at least one subsequent opening in the subsequent conductive coating; and
selectively etching the etched substrate through the at least one subsequent opening until substantially all of the substrate is replaced with the subsequent conductive coating.

4. The method of claim 1, wherein selectively etching the substrate through the at least one opening further comprises removing a sufficient portion of the substrate such that at least a portion of the conductive coating is free-standing.

5. The method of claim 1, wherein the substrate includes a member selected from the group consisting of: a semiconductor, a metal, carbon, graphene, activated carbon, carbon nanotubes, carbon nanofibers, or combinations thereof.

6. The method of claim 1, wherein the substrate is silicon.

7. The method of claim 6, further comprising doping the silicon.

8. The method of claim 1, wherein depositing the conductive coating further comprises depositing a material selected from the group consisting of: metals, metal nitrides, metal silicides, metal carbides, metal borides, or combinations thereof.

9. The method of claim 1, wherein depositing the conductive coating further comprises depositing a material selected from the group consisting of: titanium nitride, tungsten nitride, tantalum nitride, or combinations thereof.

10. The method of claim 1, wherein the selective etch is a dry etch.

11. The method of claim 1, wherein the selective etch is a wet etch.

12. The method of claim 1, wherein the substrate is silicon, the conductive coating is titanium nitride, and the etch is XeF2 or KOH.

13. A method of making an ultracapacitor electrode having an enhanced electrolyte-accessible electrically conductive surface area, comprising:
depositing a conductive coating onto a substrate;
forming at least one opening in the conductive coating; and
selectively etching the substrate through the at least one opening to provide electrolyte accessibility to a side of the conductive coating substantially oriented toward the substrate, wherein forming the at least one opening in the conductive coating further comprises depositing the conductive coating onto the porous substrate as a discontinuous coating.

14. The method of claim 1, wherein depositing the conductive coating on the substrate comprises:
coating a reactive material onto the substrate; and
reacting the reactive material with the substrate to form a conductive alloy.

15. The method of claim 14, wherein reacting the reactive material with the substrate further comprises:
the reactive material and the substrate to form the conductive coating at an interface between the reactive material and the substrate; and
removing the reactive material to expose the conductive coating.

16. The method of claim 13, further comprising:
depositing a secondary conductive coating on the etched substrate;
forming at least one secondary opening in the secondary conductive coating; and
selectively etching the etched substrate through the at least one secondary opening to provide electrolyte accessibility to a side of the secondary conductive coating substantially oriented toward the etched substrate.

17. The method of claim 16, further comprising repeatedly:
depositing a subsequent conductive coating on the etched substrate;
forming at least one subsequent opening in the subsequent conductive coating; and
selectively etching the etched substrate through the at least one subsequent opening until substantially all of the substrate is replaced with the subsequent conductive coating.

18. The method of claim 13, wherein selectively etching the substrate through the at least one opening further comprises removing a sufficient portion of the substrate such that at least a portion of the conductive coating is free-standing.

19. The method of claim 13, wherein depositing the conductive coating further comprises depositing a material selected from the group consisting of: metals, metal nitrides, metal silicides, metal carbides, metal borides, or combinations thereof.

* * * * *